(12) United States Patent
Hansen (10) Patent No.: US 11,479,059 B2
(45) Date of Patent: Oct. 25, 2022

(54) GRIPPING TOOL FOR ADJUSTABLE WHEEL BALANCING CLAMPING TOOLS

(71) Applicant: Allan Hjorth Hansen, Aarhus (DK)

(72) Inventor: Allan Hjorth Hansen, Aarhus (DK)

( * ) Notice: Subject to any disclaimer, the term of this patent is extended or adjusted under 35 U.S.C. 154(b) by 0 days.

(21) Appl. No.: 16/785,505

(22) Filed: Feb. 7, 2020

(65) Prior Publication Data

US 2020/0171878 A1 Jun. 4, 2020

Related U.S. Application Data

(63) Continuation-in-part of application No. 16/175,573, filed on Oct. 30, 2018, now Pat. No. 10,900,856.

(60) Provisional application No. 62/578,966, filed on Oct. 30, 2017, provisional application No. 62/803,171, filed on Feb. 8, 2019.

(51) Int. Cl.
*B60B 3/14* (2006.01)
*B60B 7/06* (2006.01)
*B60B 30/08* (2006.01)

(52) U.S. Cl.
CPC ............. *B60B 3/14* (2013.01); *B60B 7/068* (2013.01); *B60B 30/08* (2013.01); *B60B 2340/52* (2013.01)

(58) Field of Classification Search
CPC ........ B23Q 16/006; B23Q 16/10; B23Q 3/06; B60B 2340/50; B60B 2340/52; B60B 3/14; B60B 30/00; B60B 7/068; G01B 21/26; G01B 2210/10; G01B 3/12; G01B 5/255; G01M 1/045
See application file for complete search history.

(56) References Cited

U.S. PATENT DOCUMENTS

| | | | |
|---|---|---|---|
| 3,143,327 A * | 8/1964 | Watt | G01M 1/045 248/205.1 |
| 4,885,962 A | 12/1989 | Summers | |
| 6,138,366 A * | 10/2000 | Boess | G01B 5/255 33/203.18 |
| 2004/0003646 A1 | 1/2004 | Herbold | |
| 2005/0076519 A1* | 4/2005 | Gerdes | G01B 5/255 33/203 |
| 2009/0278295 A1* | 11/2009 | Ohnesorge | G01M 1/045 269/57 |
| 2015/0069824 A1 | 3/2015 | Matsler | |

FOREIGN PATENT DOCUMENTS

GB 170283 A 7/1922
GB 2513905 A 11/2014

* cited by examiner

*Primary Examiner* — Tyrone V Hall, Jr.

(57) ABSTRACT

A gripping tool for adjustable wheel balancing clamping tool includes a gripping body and an adjustable-bolt-pattern-adaptor attachment mechanism. The gripping body that enables the user to grasp the clamping tool includes an outer annular body, an inner annular body, and a connector ring. The inner annular body is concentrically positioned within the outer annular body. The connector ring is perimetrically connected the outer annular body and the inner annular body. The connector ring is terminally positioned to a first outer edge of the outer annular body and a first inner edge of the inner annular body. The adjustable-bolt-pattern-adaptor attachment mechanism is connected to the outer annular body and the inner annular body thus securing the gripping body to the clamping tool.

14 Claims, 14 Drawing Sheets

GRIPPING TOOL FOR ADJUSTABLE WHEEL BALANCING CLAMPING TOOLS

The current application claims a priority to the U.S. Provisional Patent application Ser. No. 62/803,171 filed on Feb. 8, 2019.

FIELD OF THE INVENTION

The present invention relates generally to a grip system. More specifically, the present invention relates to a grip system for a wheel balancing clamping tool that can adjust to different bolt patterns.

BACKGROUND OF THE INVENTION

Existing adjustable wheel balancing clamping tools that can adjust to different bolt patterns require two hands to operate, with one hand holding the tool and the other hand adjusting the bolt pattern of the tool with respect to the wheel. More specifically, the tool is adjusted to fit the specific bolt pattern of the wheel, by rotating one of the gears. Since the adjustable wheel balancing clamping tools require both hands to adjust for a new bolt pattern, the user does not have a free hand to stabilize the tool and/or the wheel, to be balanced, during the mounting process of the wheel to the balancing machine. Therefore, two steps are generally required for balancing a wheel with a new bolt pattern. First, the user must use both hands to hold and adjust the adjustable wheel balancing clamping tool to the correct bolt pattern according to the wheel. Generally, the wheel is flipped and the adjustable wheel balancing clamping tool is positioned against the back of the center bore wheel hub to correctly adjust the adjustable wheel balancing clamping tool according to the bolt pattern of the wheel. Then, the user uses one hand to mount the wheel on a wheel balancing machine, and the other hand to hold the adjustable wheel balancing clamping tool.

Clearly, there is a need for an improvement to adjustable wheel balancing clamping tools that allow individuals to hold and adjust the tool with one hand. Such improvement can combine the aforementioned two-step process into a one-step process thus saving time and money. The present invention addresses this issue by providing a gripping tool for the adjustable wheel balancing clamping tool. The present invention provides additional gripping surface area to the adjustable wheel balancing clamping tool that allows an individual to simultaneously adjust and hold the tool with one hand.

DETAIL DESCRIPTIONS OF THE INVENTION

All illustrations of the drawings are for the purpose of describing selected versions of the present invention and are not intended to limit the scope of the present invention.

The present invention is a gripping tool for adjustable wheel balancing clamping tool so that the user is able to hold and adjust the adjustable wheel balancing clamping tool with only one hand. More specifically, the adjustable wheel balancing clamping tool enables the user to reliably mount a wheel on a wheel balancing machine in a desired orientation. To accomplish this, the adjustable wheel balancing clamping tool employs a stud adjustment system in order to change the orientation of the studs that engages with lug holes of the wheel. Generally, the user holds the adjustable wheel balancing clamping tool with one hand while the other hand is used to operate the stud adjustment system, which adjust the bolt pattern with respect to the wheel. However, the present invention functions as an accessory tool for the adjustable wheel balancing clamping tool so that the user can hold the adjustable wheel balancing clamping tool and operate the stud adjustment system with one hand.

The present invention comprises a gripping body 1 and an adjustable-bolt-pattern-adaptor attachment mechanism 10 as shown in FIGS. 1-2 and 6-7. The gripping body 1 provides ergonomic surface area so that the user can comfortably grasp the present invention. The gripping body 1 comprises an outer annular body 2, an inner annular body 6, and a connector ring 9 thus delineating ring shaped body. In reference to the general configuration of the present invention, the inner annular body 6 is concentrically positioned within the outer annular body 2. The connector ring 9 is perimetrically connected the outer annular body 2 and the inner annular body 6 as the structural body between the inner annular body 6 and the outer annular body 2. The connector ring 9 is terminally positioned to a first outer edge 3 of the outer annular body 2 and a first inner edge 7 of the inner annular body 6 so that the connector ring 9 can be positioned flush with the inner annular body 6 and the outer annular body 2. When the present invention is secured within the user's hand, the user can use their fingers to apply upward tension to the inner annular body 6 thus pressing the connector ring 9 against the user's palm. Simultaneously, the user can user their palm to apply tension to the connector ring 9 thus pressing the inner annular body 6 towards the user's fingers. As a result, the user can position their thumb over the outer annular body 2 to operate the stud adjustment system so that the bolt pattern of the adjustable wheel balancing clamping tool can be adjusted. The adjustable-bolt-pattern-adaptor attachment mechanism 10 is connected to the outer annular body 2 and the inner annular body 6 and functions as the attachment mechanism 10 that secures the present invention to the adjustable wheel balancing clamping tool. Furthermore, the adjustable-bolt-pattern-adaptor attachment mechanism 10 and the connector ring 9 are oppositely oriented of each other about the outer annular body 2 and the inner annular body 6 so that the stud adjustment system can be independently operated from the gripping body 1.

Figure 1:
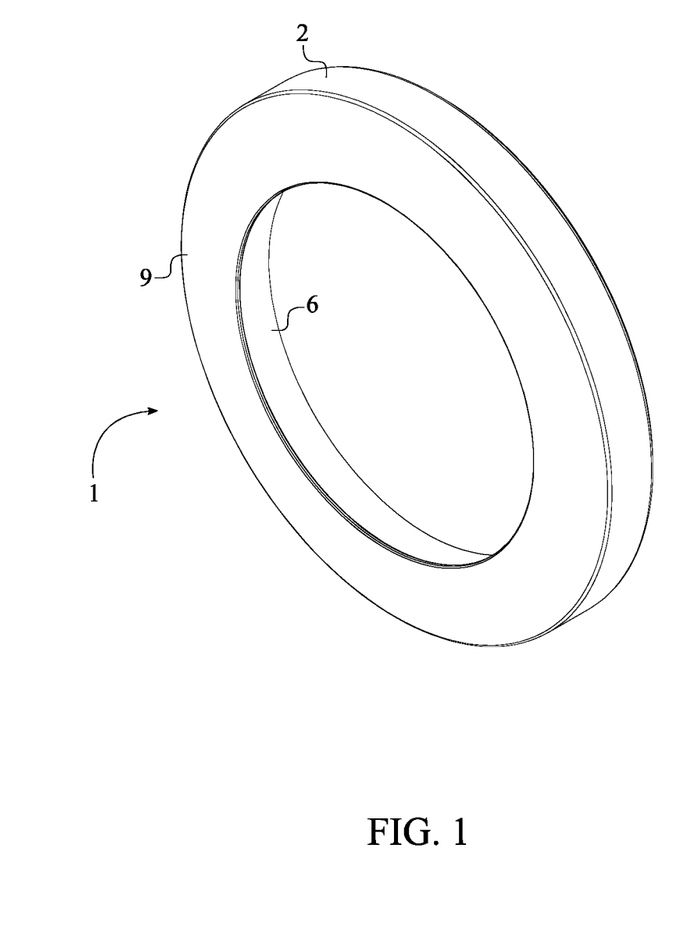
FIG. 1 is a front perspective view of the gripping body of the present invention with the preferred attachment mechanism.
Figure 2:
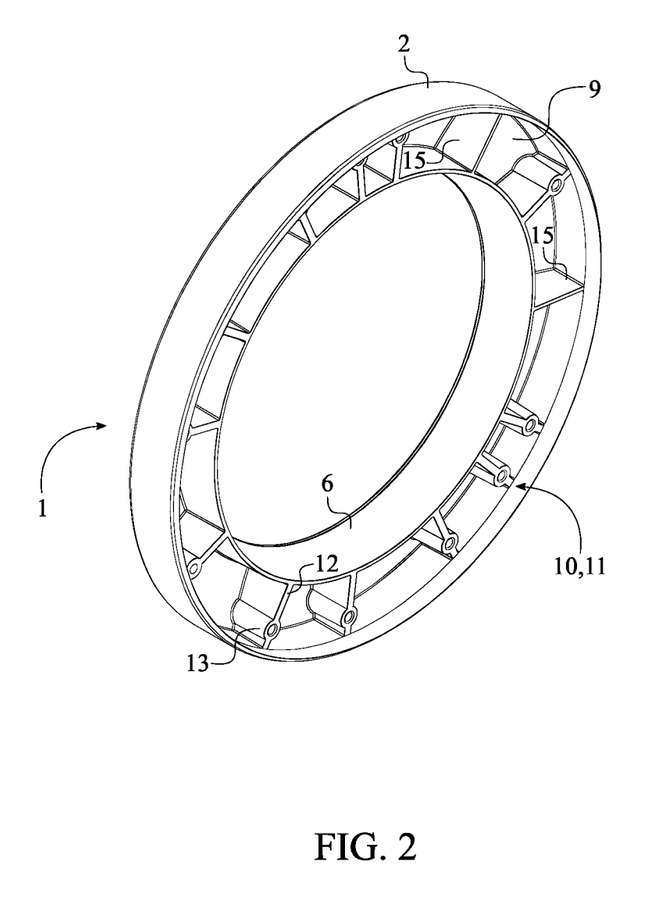
FIG. 2 is a rear perspective view of the gripping body of the present invention with the preferred attachment mechanism.
Figure 3:
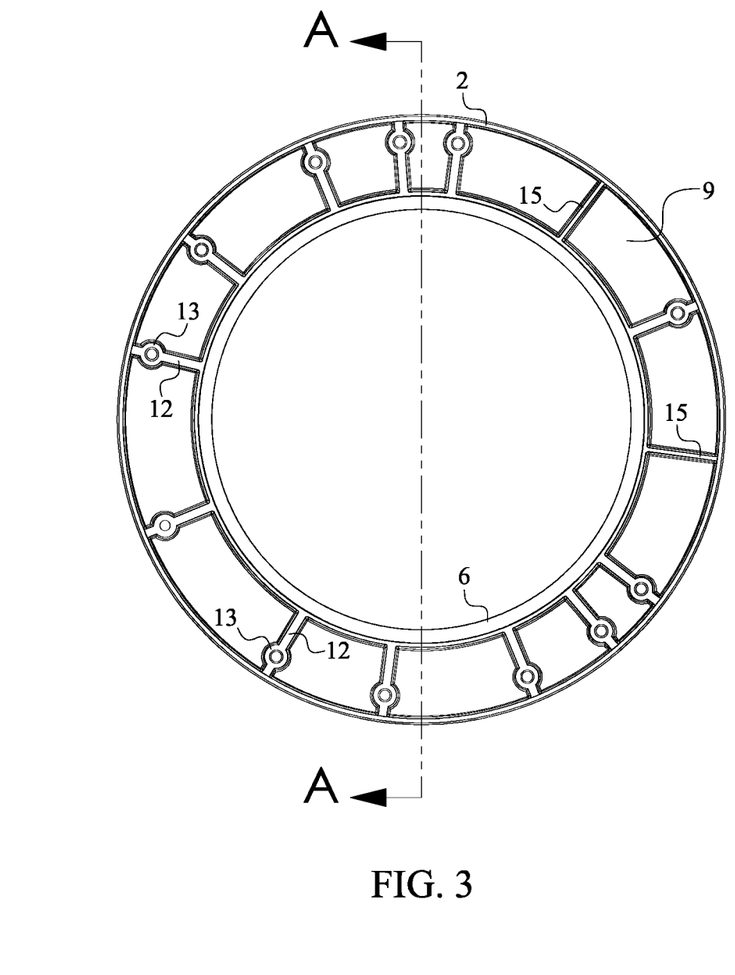
FIG. 3 is a rear view of the present invention, showing the plane upon which a cross sectional view is taken shown in FIG. 4.

In reference to FIG. 2-3, the adjustable-bolt-pattern-adaptor attachment mechanism 10 preferably comprises a plurality of fasteners 11 that is radially positioned in between the outer annular body 2 and the inner annular body 6. The plurality of fasteners 11 functions as the attachment bodies for the gripping body 1 so that the present invention can be removably mounted to the adjustable wheel balancing clamping tool.

Figure 5:
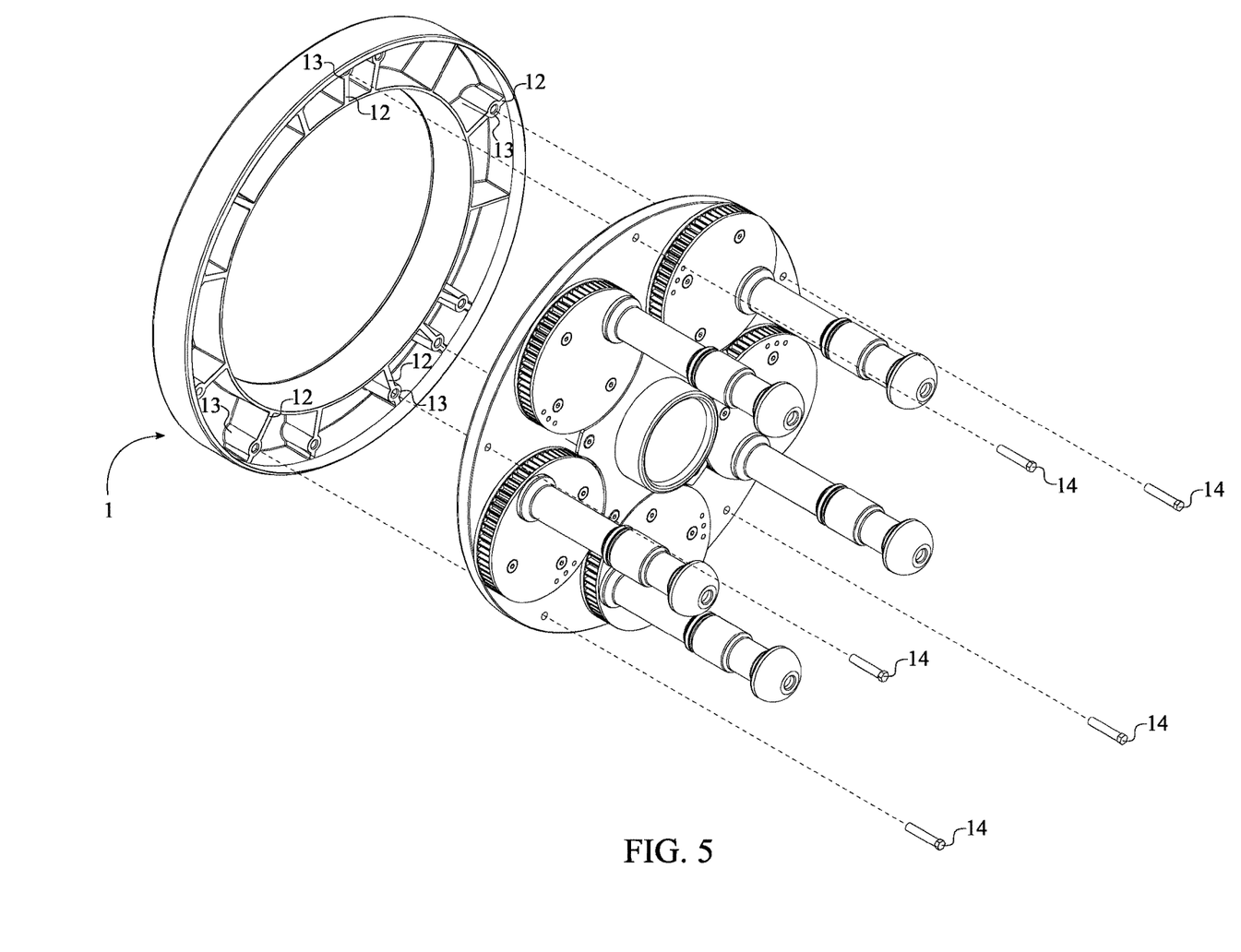
FIG. 5 is a perspective exploded view of the present invention, wherein the preferred attachment mechanism is utilized to engage with the adjustable wheel balancing clamping tool.
Figure 6:
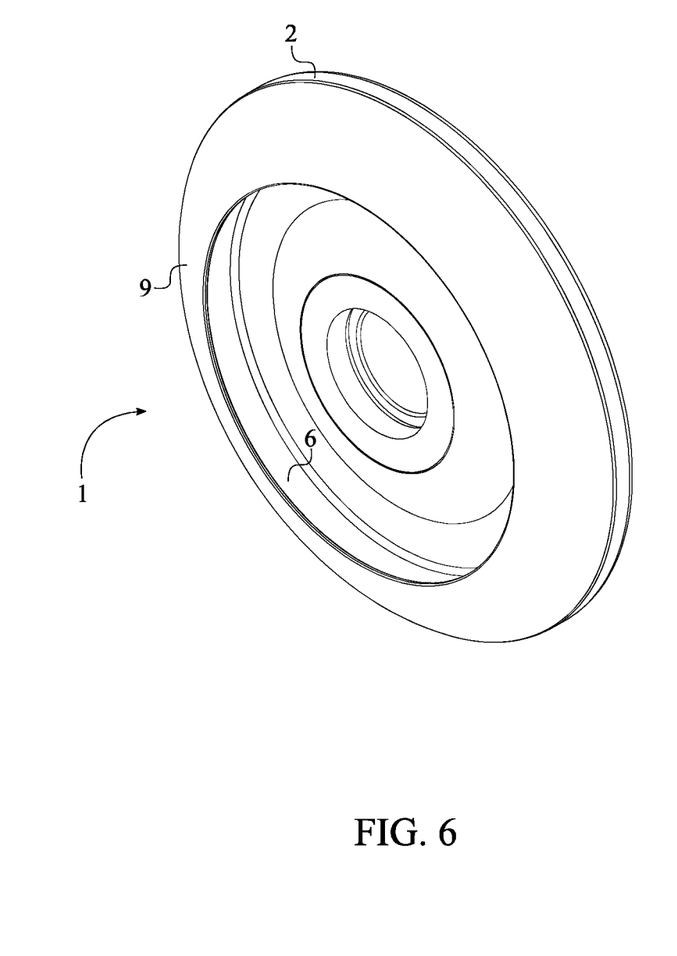
FIG. 6 is a front perspective view of the gripping body of the present invention, wherein the gripping body is integrated into the base plate of the adjustable wheel balancing clamping tool.
Figure 7:
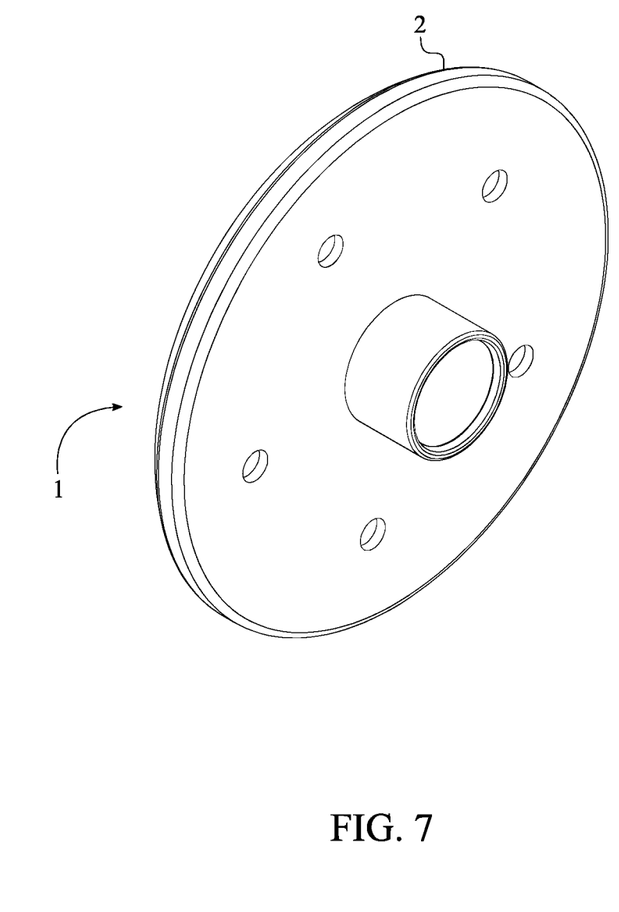
FIG. 7 is a rear perspective view of the gripping body of the present invention, wherein the gripping body is integrated into the base plate of the adjustable wheel balancing clamping tool.
Figure 8:
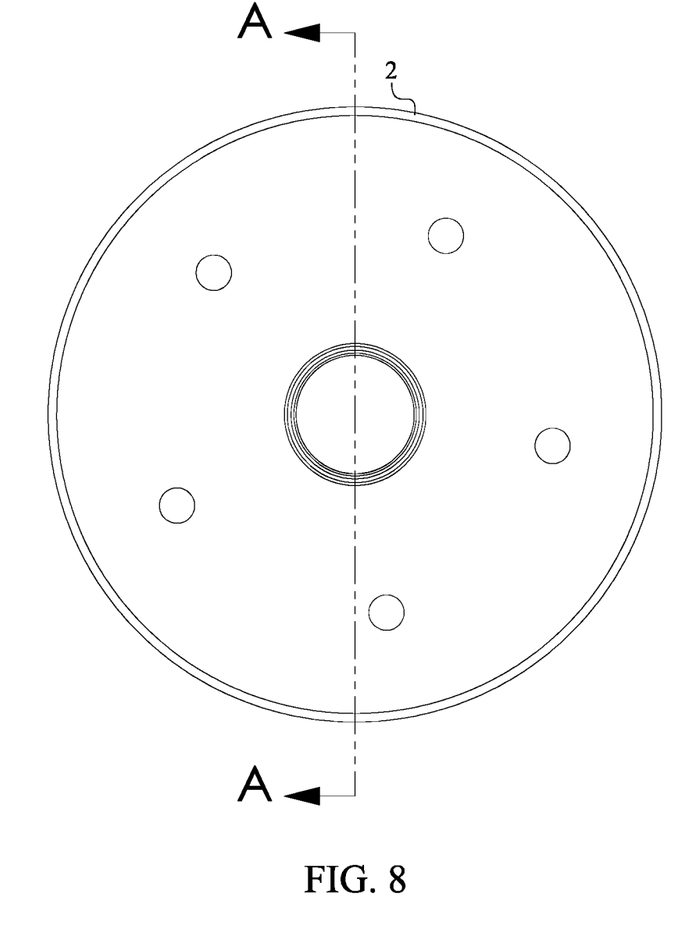
FIG. 8 is a rear view of the present invention being integrated into the base plate of the adjustable wheel balancing clamping tool, showing the plane upon which a cross sectional view is taken shown in FIG. 9.
Figure 9:
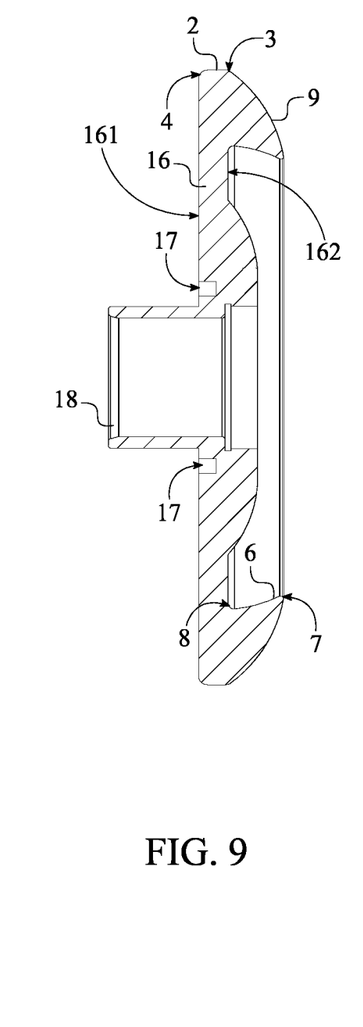
FIG. 9 is a cross section view thereof taken along line A-A of FIG. 8, showing the edges of the outer annular body and the inner annular body.
Figure 10:
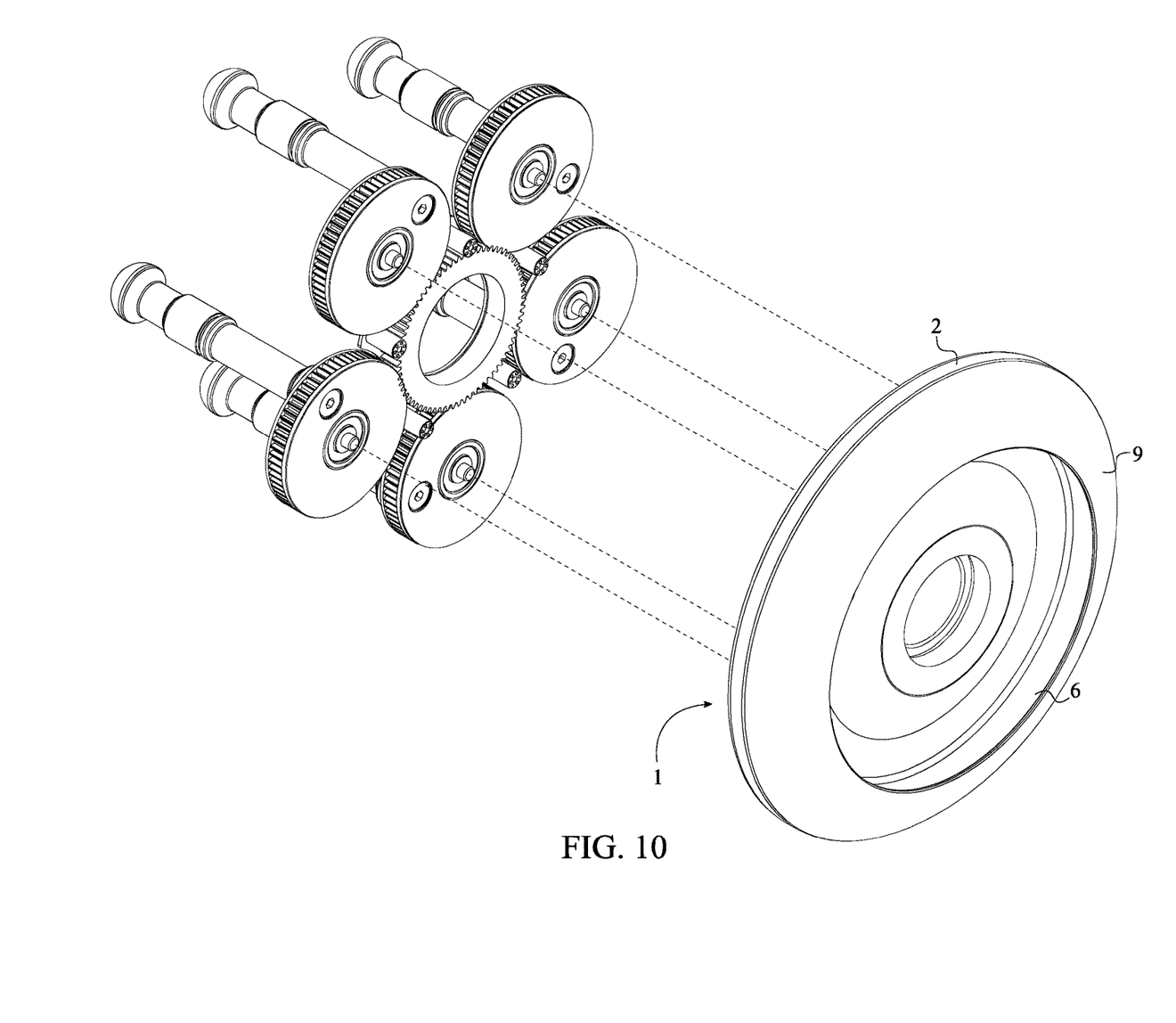
FIG. 10 is a perspective exploded view of the present invention being integrated into the base plate of the adjustable wheel balancing clamping tool, wherein the stud adjustment system is separated from the base plate.
Figure 11:
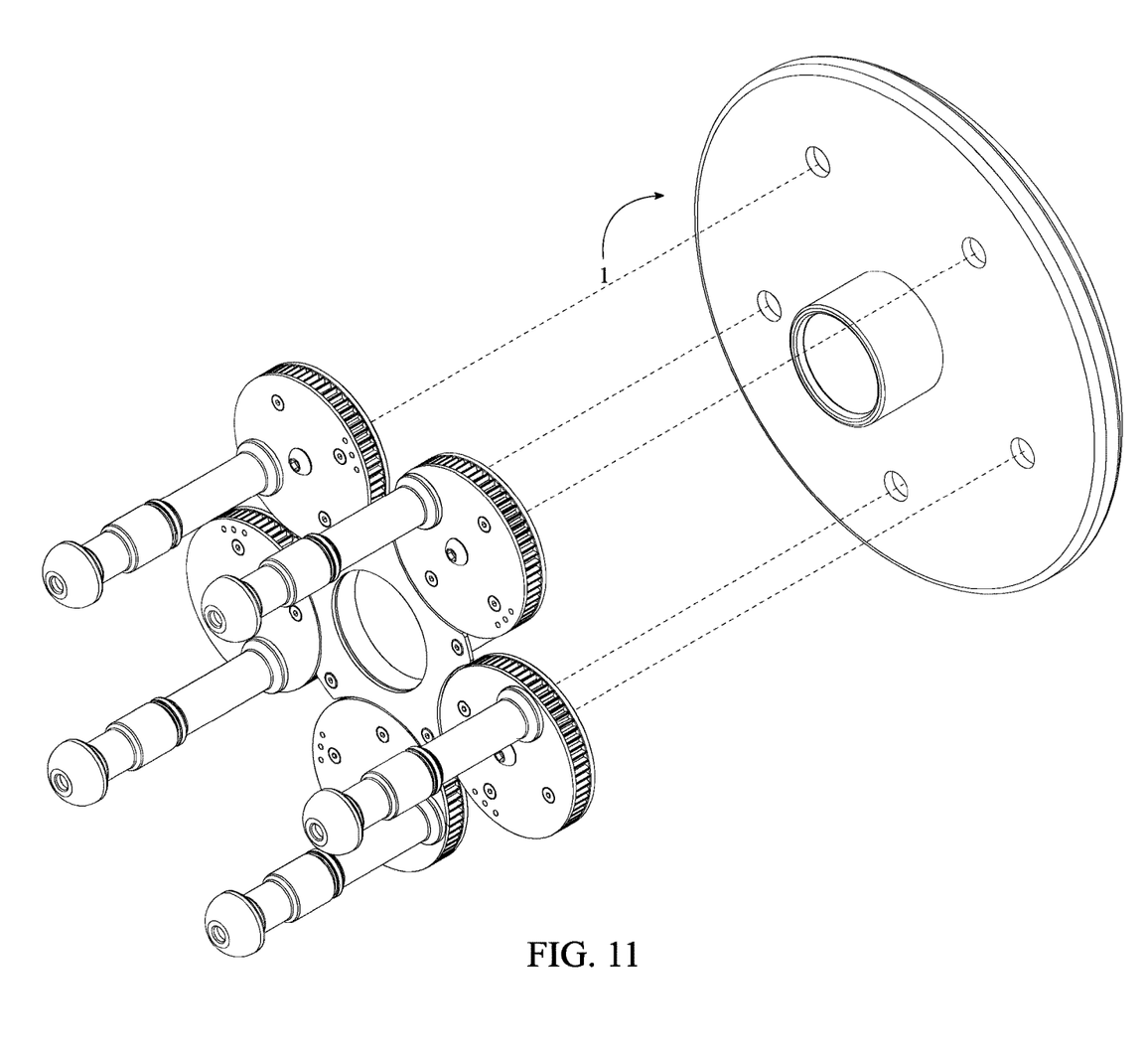
FIG. 11 is another perspective exploded view of the present invention being integrated into the base plate of the adjustable wheel balancing clamping tool, wherein the stud adjustment system is separated from the base plate.

In reference to FIG. 2-3 and FIG. 5, the plurality of fasteners 11 each comprises a supporting rib 12, a female fastening portion 13, and a male fastening portion 14. More specifically, the supporting rib 12 is generally a rectangular body and terminally connected to the outer annular body 2, the inner annular body 6, and the connector ring 9. As a result, the supporting rib 12 is able to firmly secure to the gripping body 1 with three different connection points. The female fastening portion 13 is generally cylindrical body and connected to the supporting rib 12 and oriented away from the connector ring 9. In other words, the female fastening portion 13 is integrated into the supporting rib 12 so that an opening of the female fastening portion 13 is oriented in the opposite direction in comparison to the connector ring 9. The male fastening portion 14 is removably engaged with the female fastening portion 13 in such a way that the male fastening portion 14 and the female fastening portion 13 can collectively compress a base plate of the adjustable wheel balancing clamping tool. Preferably, the male fastening portion 14 and the female fastening portion 13 are threadedly interconnected to each other so that the user is able to easily interact with the male fastening portion 14 with standard tooling apparatus such as screwdrivers, ratchet wrenches, and impact drivers. More specifically, the male fastening portion 14 is designed to traverse through a cavity of the base plate so that the male fastening portion 14 can threadedly interconnect with the female fastening portion 13.

In reference to FIG. 3, the adjustable-bolt-pattern-adaptor attachment mechanism 10 further comprises a plurality of structural ribs 15 in addition to the plurality of fasteners 11. The plurality of structural ribs 15 is terminally connected to the outer annular body 2, the inner annular body 6, and the connector ring 9 to improve the structural integrity of the gripping body 1. Furthermore, each of the plurality of structural ribs 15 is radially spaced within the plurality of fasteners 11 to further structurally strengthen the each of the plurality of fasteners 11. As a result, the present invention can eliminate any structural misalignment as the female fastening portion 13 of each of the plurality of fasteners 11 can concentrically align with the cavities of the base plate to receive the male fastening portion 14.

Figure 4:
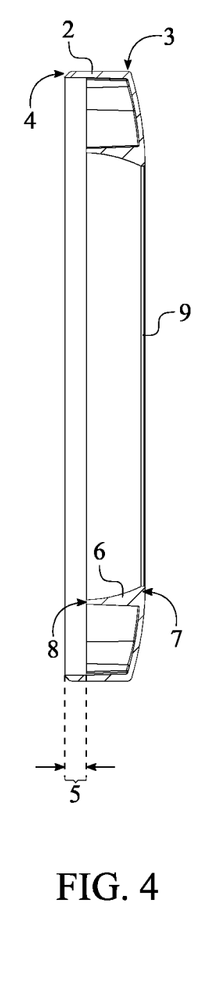
FIG. 4 is a cross section view thereof taken along line A-A of FIG. 3, showing the edges of the outer annular body and the inner annular body.

In reference to FIG. 4, the outer annular body 2 further comprises a second outer edge 4 and a lip section 5, and the inner annular body 6 further comprises a second inner edge 8. The second outer edge 4 and the first outer edge 3 are oppositely positioned of each other about the outer annular body 2, wherein the second outer edge 4 is preferably a free hanging edge. The second inner edge 8 and the first inner edge 7 are oppositely positioned of each other about the inner annular body 6, wherein the second inner edge 8 is preferably a free hanging edge. Furthermore, the supporting rib 12 is positioned flush to the second inner edge 8 so that the second inner edge 8 and the plurality of fasteners 11 can position flat against the base plate. The lip section 5 is delineated from the supporting rib 12 to the second outer edge 4 so that the lip section 5 can perimetrically encircle around the base plate thus providing a precise alignment between the gripping body 1 and the base plate. Resultantly, the user can stationary grasp the adjustable wheel balancing clamping tool via the plurality of fasteners 11 and the gripping body 1 and adjust the bolt pattern with respect to the corresponding wheel by only utilizing one hand.

Figure 14:
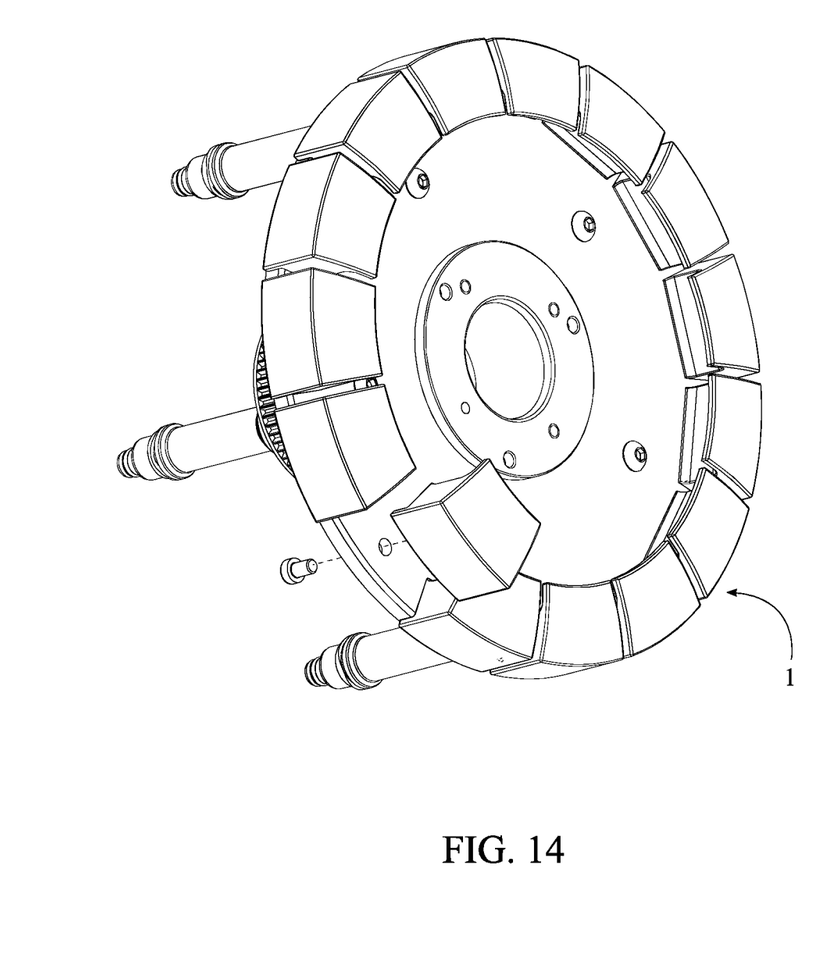
FIG. 14 is a perspective exploded view of alternative embodiment of the present invention, wherein the gripping body and the adjustable-bolt-pattern-adaptor attachment mechanism are a plurality of segmented pieces.

Even though the gripping body 1 and the adjustable-bolt-pattern-adaptor attachment mechanism 10 are preferably configured as a single apparatus, in alternative embodiments of the present invention, the gripping body 1 and the adjustable-bolt-pattern-adaptor attachment mechanism 10 can be made as a plurality of segmented pieces as shown in FIG. 14. In reference to an exemplary embodiment, the outer annular body 2, the inner annular body 6, the connector ring 9, and the adjustable-bolt-pattern-adaptor attachment mechanism 10 can be manufactured as separate components and assembled together. In reference to another exemplary embodiment, the gripping body 1 and the adjustable-bolt-pattern-adaptor attachment mechanism 10 can also be segmented into a plurality of radial sections as the general profile of the gripping body 1 is collectively configured through the plurality of radial sections.

In reference to FIG. 6-11, the present invention can be alternatively integrated into the base plate of the adjustable wheel balancing clamping tool. Thus, the adjustable-bolt-pattern-adaptor attachment mechanism 10 may comprise a base plate 16, a plurality of pin-receiving recesses 17, and a central bushing 18. In other words, the functionality of the present invention and the base plate 16 are integrated to each other as the general profile of the gripping body 1 and the base plate are constructed as a singular body. More specifically, the base plate 16 is radially connected to the outer annular body 2 and the inner annular body 6 thus enclosing the internal space between the outer annular body 2 and the inner annular body 6. The base plate 16 is terminally connected to the second outer edge 4 and the second inner edge 8 thus providing a structural base to configure the stud adjustment system around the central bushing. The central bushing 18 is concentrically connected to the base plate 16 so that the central bushing 18 can be mounted to the wheel balancing machine. The plurality of pin-receiving recesses 17 traverses into the base plate 16 and is distributed around the central bussing 18. More specifically, a first base surface 161 of the base plate 16 is radially connected onto the second inner edge 8 as the first base surface 161 extends from the inner annular body 6 to the central bushing 18. A second base surface 162 of the base plate 16 is positioned flush with the second outer edge 4 as the second base surface 162 extends from the second outer edge 4 to the central bushing 18. Resultantly, the user can stationarily grasp the adjustable wheel balancing clamping tool via the outer annular body 2 and the inner annular body 6 with respect to the first base surface 161 so that the bolt pattern can be adjusted via the stud adjustment system that is positioned adjacent to the second base surface 162 by only utilizing one hand.

Figure 12:
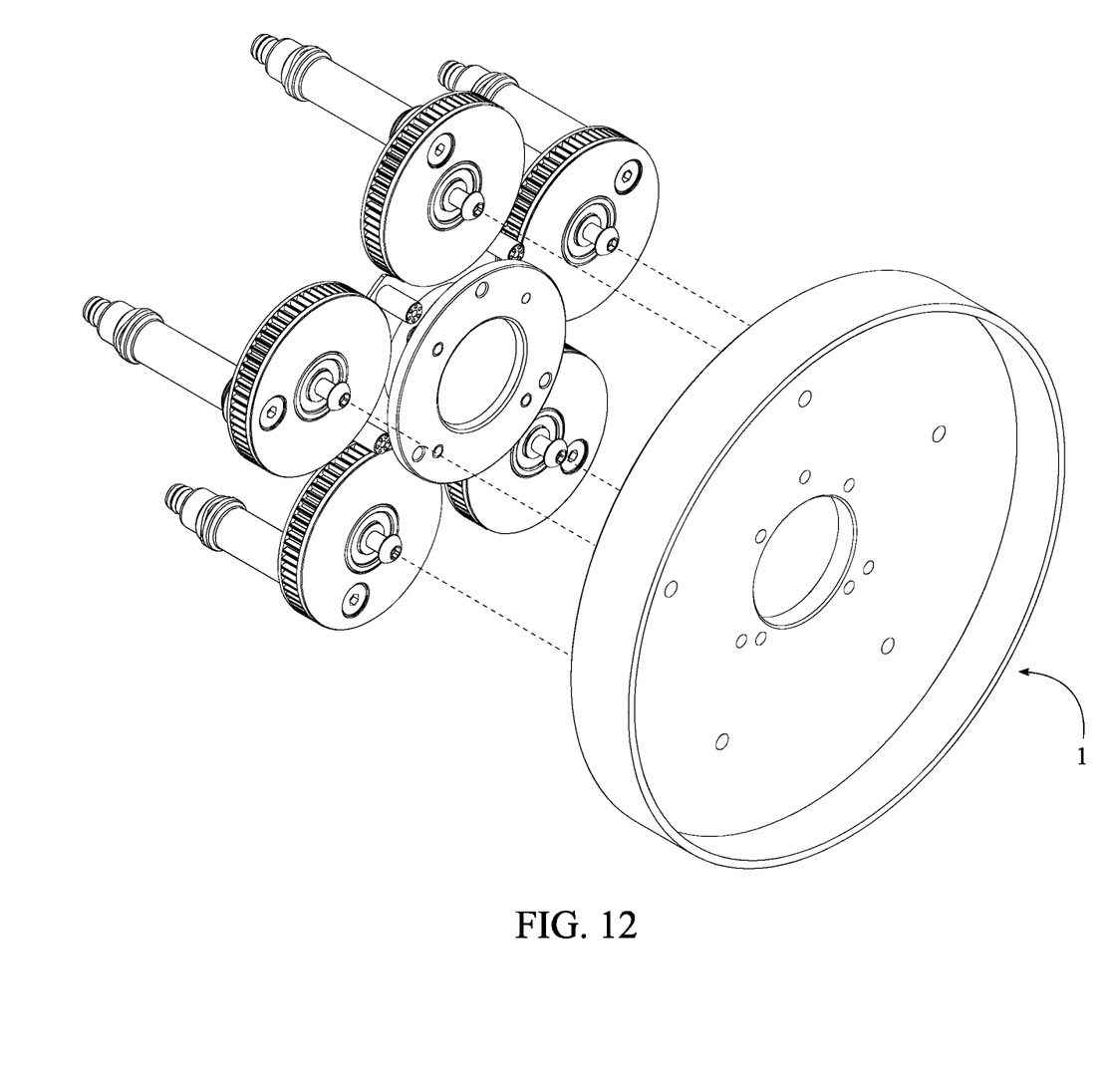
FIG. 12 is a perspective exploded view of alternative embodiment of the present invention as the base plate of the adjustable wheel balancing clamping tool and the gripping tool are being integrated into each other, wherein the stud adjustment system is separated from the base plate.

In reference to FIG. 12, the present invention can be alternatively integrated into the base plate of the adjustable wheel balancing clamping tool thus defining an alternative embodiment. More specifically, the base plate is radially connected to the outer annular body 2. The base plate is terminally connected to the second outer edge 4 thus providing a structural base to configure the stud adjustment system the central bushing. The central bushing is concentrically connected to the base plate so that the central bushing can be mounted to the wheel balancing machine.

Figure 13:
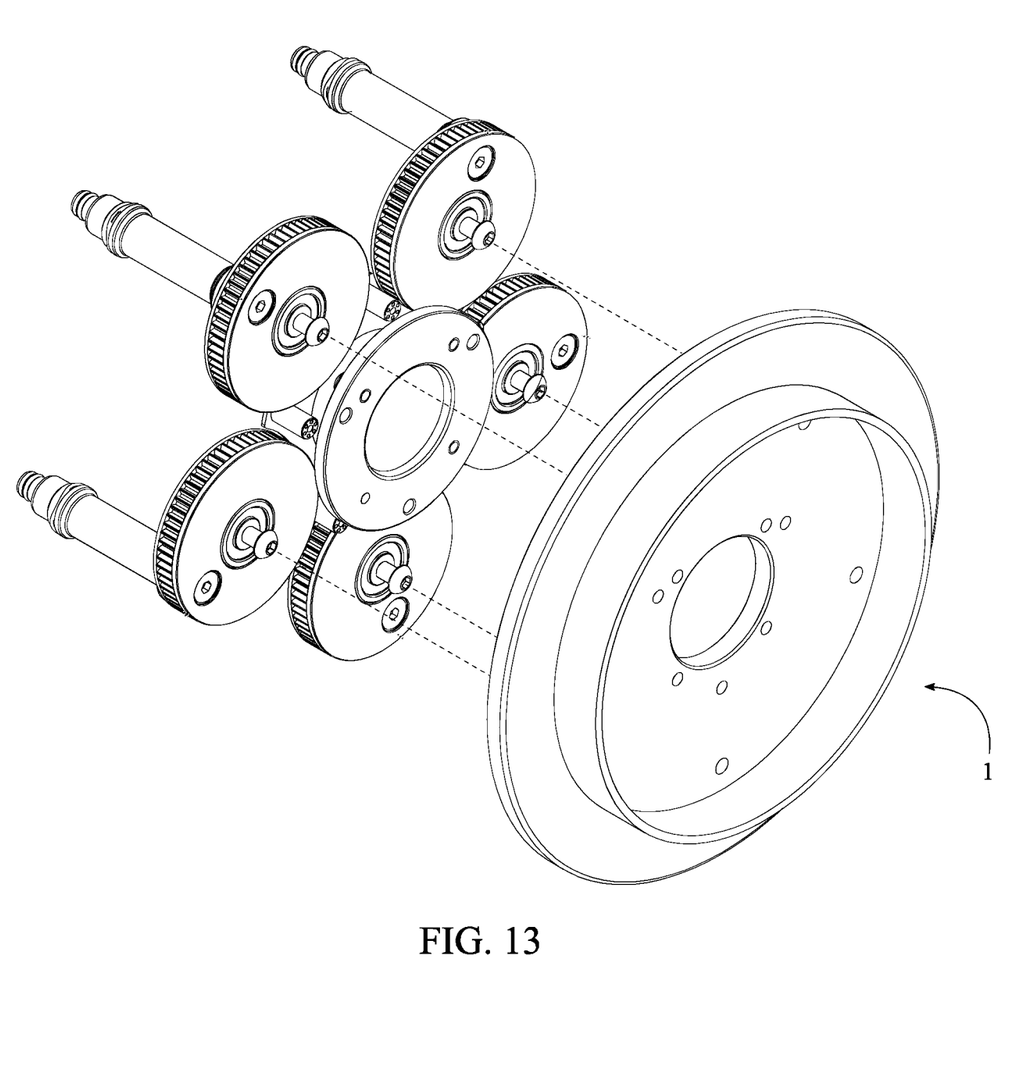
FIG. 13 is a perspective exploded view of alternative embodiment of the present invention as the base plate of the adjustable wheel balancing clamping tool and the gripping tool are being integrated into each other, wherein the stud adjustment system is separated from the base plate.

In reference to FIG. 13, the present invention can be alternatively integrated into the base plate of the adjustable wheel balancing clamping tool thus defining another alternative embodiment. More specifically, the base plate is radially connected to the inner annular body 6. The base plate is terminally connected to the second inner edge 8 thus providing a structural base to configure the stud adjustment system the central bushing. The central bushing is concentrically connected to the base plate so that the central bushing can be mounted to the wheel balancing machine.

Although the invention has been explained in relation to its preferred embodiment, it is to be understood that many other possible modifications and variations can be made without departing from the spirit and scope of the invention as hereinafter claimed.

What is claimed is:

1. A gripping tool for adjustable wheel balancing clamping tool comprising:
    a gripping body;
    an adjustable-bolt-pattern-adaptor attachment mechanism;
    the gripping body comprising an outer annular body, an inner annular body, and a connector ring;
    the inner annular body being concentrically positioned within the outer annular body;
    the connector ring being perimetrically connected to the outer annular body and the inner annular body;
    the connector ring being terminally positioned to a first outer edge of the outer annular body and a first inner edge of the inner annular body;
    a cross section between the outer annular body, the connector ring, and the inner annular body being a U-shaped cross section;
    the adjustable-bolt-pattern-adaptor attachment mechanism being connected to the outer annular body and the inner annular body; and
    the adjustable-bolt-pattern-adaptor attachment mechanism and the connector ring being oppositely oriented of each other about the outer annular body and the inner annular body.

2. The gripping tool for adjustable wheel balancing clamping tool as claimed in claim 1 comprising:
    the adjustable-bolt-pattern-adaptor attachment mechanism comprising a plurality of fasteners; and
    the plurality of fasteners being radially positioned in between the outer annular body and the inner annular body.

3. The gripping tool for adjustable wheel balancing clamping tool as claimed in claim 2 comprising:
    the plurality of fasteners each comprising a supporting rib, a female fastening portion, and a male fastening portion;
    the supporting rib being terminally connected to the outer annular body, the inner annular body, and the connector ring;
    the female fastening portion connected to the supporting rib;
    the female fastening portion being fixed in place along the supporting rib;
    the female fastening portion being positioned offset from the outer annular body;
    the female fastening portion being positioned offset from the inner annular body;
    the female fastening portion being oriented away from the connector ring; and
    the male fastening portion being removably engaged with the female fastening portion.

4. The gripping tool for adjustable wheel balancing clamping tool as claimed in claim 3 comprising:
    the outer annular body further comprises a second outer edge and a lip section;
    the inner annular body further comprises a second inner edge;
    the second outer edge and the first outer edge being oppositely positioned of each other about the outer annular body;
    the second inner edge and the first inner edge being oppositely positioned of each other about the inner annular body;
    the supporting rib being positioned flush to the second inner edge; and
    the lip section being delineated from the supporting rib to the second outer edge.

5. The gripping tool for adjustable wheel balancing clamping tool as claimed in claim 2 comprising:
    the adjustable-bolt-pattern-adaptor attachment mechanism further comprising a plurality of structural ribs;
    the plurality of structural ribs being terminally connected to the outer annular body, the inner annular body, and the connector ring; and
    the plurality of structural ribs being radially interspersed amongst the plurality of fasteners.

6. A gripping tool for adjustable wheel balancing clamping tool comprising:
    a gripping body;
    an adjustable-bolt-pattern-adaptor attachment mechanism;
    the gripping body comprising an outer annular body, an inner annular body, and a connector ring;
    the inner annular body being concentrically positioned within the outer annular body;
    the connector ring being perimetrically connected to the outer annular body and the inner annular body;

the connector ring being terminally positioned to a first outer edge of the outer annular body and a first inner edge of the inner annular body;

a cross section between the outer annular body, the connector ring, and the inner annular body being a U-shaped cross section;

the adjustable-bolt-pattern-adaptor attachment mechanism being connected to the outer annular body and the inner annular body;

the adjustable-bolt-pattern-adaptor attachment mechanism and the connector ring being oppositely oriented of each other about the outer annular body and the inner annular body;

the adjustable-bolt-pattern-adaptor attachment mechanism comprising a plurality of fasteners; and the plurality of fasteners being radially positioned in between the outer annular body and the inner annular body.

7. The gripping tool for adjustable wheel balancing clamping tool as claimed in claim 6 comprising:

the plurality of fasteners each comprising a supporting rib, a female fastening portion, and a male fastening portion;

the supporting rib being terminally connected to the outer annular body, the inner annular body, and the connector ring;

the female fastening portion connected to the supporting rib;

the female fastening portion being fixed in place along the supporting rib;

the female fastening portion being positioned offset from the outer annular body;

the female fastening portion being positioned offset from the inner annular body;

the female fastening portion being oriented away from the connector ring; and the male fastening portion being removably engaged with the female fastening portion.

8. The gripping tool for adjustable wheel balancing clamping tool as claimed in claim 7 comprising:

the outer annular body further comprises a second outer edge and a lip section;

the inner annular body further comprises a second inner edge;

the second outer edge and the first outer edge being oppositely positioned of each other about the outer annular body;

the second inner edge and the first inner edge being oppositely positioned of each other about the inner annular body;

the supporting rib being positioned flush to the second inner edge; and the lip section being delineated from the supporting rib to the second outer edge.

9. The gripping tool for adjustable wheel balancing clamping tool as claimed in claim 6 comprising:

the adjustable-bolt-pattern-adaptor attachment mechanism further comprising a plurality of structural ribs;

the plurality of structural ribs being terminally connected to the outer annular body, the inner annular body, and the connector ring; and the plurality of structural ribs being radially interspersed amongst the plurality of fasteners.

10. A gripping tool for adjustable wheel balancing clamping tool comprising:

a gripping body;

an adjustable-bolt-pattern-adaptor attachment mechanism;

the gripping body comprising an outer annular body, an inner annular body, and a connector ring;

the inner annular body being concentrically positioned within the outer annular body;

the connector ring being perimetrically connected to the outer annular body and the inner annular body;

the connector ring being terminally positioned to a first outer edge of the outer annular body and a first inner edge of the inner annular body;

a cross section between the outer annular body, the connector ring, and the inner annular body being a U-shaped cross section;

the adjustable-bolt-pattern-adaptor attachment mechanism being connected to the outer annular body and the inner annular body;

the adjustable-bolt-pattern-adaptor attachment mechanism and the connector ring being oppositely oriented of each other about the outer annular body and the inner annular body;

the adjustable-bolt-pattern-adaptor attachment mechanism comprising a plurality of fasteners;

the plurality of fasteners being radially positioned in between the outer annular body and the inner annular body;

the plurality of fasteners each comprising a supporting rib, a female fastening portion, and a male fastening portion;

the supporting rib being terminally connected to the outer annular body, the inner annular body, and the connector ring;

the female fastening portion connected to the supporting rib;

the female fastening portion being fixed in place along the supporting rib;

the female fastening portion being positioned offset from the outer annular body;

the female fastening portion being positioned offset from the inner annular body;

the female fastening portion being oriented away from the connector ring;

the male fastening portion being removably engaged with the female fastening portion;

the adjustable-bolt-pattern-adaptor attachment mechanism further comprising a plurality of structural ribs;

the plurality of structural ribs being terminally connected to the outer annular body, the inner annular body, and the connector ring; and the plurality of structural ribs being radially interspersed amongst the plurality of fasteners.

11. The gripping tool for adjustable wheel balancing clamping tool as claimed in claim 10 comprising:

the outer annular body further comprises a second outer edge and a lip section;

the inner annular body further comprises a second inner edge;

the second outer edge and the first outer edge being oppositely positioned of each other about the outer annular body;

the second inner edge and the first inner edge being oppositely positioned of each other about the inner annular body;

the supporting rib being positioned flush to the second inner edge; and the lip section being delineated from the supporting rib to the second outer edge.

12. The gripping tool for adjustable wheel balancing clamping tool as claimed in claim 1 comprising:

the adjustable-bolt-pattern-adaptor attachment mechanism comprising a base plate, a plurality of pin-receiving recesses, and a central bushing;

the base plate being radially connected to the outer annular body and the inner annular body;

the central bushing being concentrically connected to the base plate;

the plurality of pin-receiving recesses traversing into the base plate; and the plurality of pin-receiving recesses being distributed around the central bushing.

13. The gripping tool for adjustable wheel balancing clamping tool as claimed in claim 12 comprising:

the outer annular body further comprises a second outer edge;

the inner annular body further comprises a second inner edge;

the second outer edge and the first outer edge being oppositely positioned of each other about the outer annular body;

the second inner edge and the first inner edge being oppositely positioned of each other about the inner annular body; and the base plate being terminally connected to the second outer edge and the second inner edge.

14. The gripping tool for adjustable wheel balancing clamping tool as claimed in claim 13 comprising:

the base plate comprising a first base surface and a second base surface;

the first base surface being radially connected onto the second inner edge;

the first base surface being extended from the outer annular body to the central bushing;

the second base surface being positioned flush with the second outer edge; and the second base surface being extended from the second outer edge to the central bushing.

\* \* \* \* \*